(12) United States Patent
Frye et al.

(10) Patent No.: US 9,237,534 B2
(45) Date of Patent: Jan. 12, 2016

(54) MOBILE APPLICATION DRX SYNCHRONIZATION WITH EMBEDDED VEHICLE HARDWARE

(75) Inventors: Mark S. Frye, Grosse Pointe Woods, MI (US); Lawrence D. Cepuran, Northville, MI (US); Steven P. Schwinke, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1328 days.

(21) Appl. No.: 13/072,215

(22) Filed: Mar. 25, 2011

(65) Prior Publication Data

US 2012/0243528 A1    Sep. 27, 2012

(51) Int. Cl.
*H04W 56/00*    (2009.01)
(52) U.S. Cl.
CPC ..................... *H04W 56/00* (2013.01)
(58) Field of Classification Search
CPC .................................................... H04W 56/00
USPC .......................................................... 370/350
See application file for complete search history.

(56) References Cited

U.S. PATENT DOCUMENTS

| | | | |
|---|---|---|---|
| 8,160,656 B2* | 4/2012 | Van Bosch et al. | 455/574 |
| 8,781,442 B1* | 7/2014 | Link, II | 455/411 |
| 2003/0109268 A1 | 6/2003 | Fraser et al. | |
| 2003/0413976 | 7/2003 | Wang | |
| 2003/0185162 A1 | 10/2003 | Fraser et al. | |
| 2003/0211854 A1 | 11/2003 | Mazzara, Jr. | |
| 2003/0232619 A1* | 12/2003 | Fraser | 455/420 |
| 2004/0009772 A1 | 1/2004 | Mazzara, Jr. | |
| 2004/0198255 A1* | 10/2004 | Hayashida | 455/99 |
| 2004/0203340 A1 | 10/2004 | Oesterling | |
| 2004/0203634 A1 | 10/2004 | Wang et al. | |
| 2004/0203692 A1 | 10/2004 | Schwinke et al. | |
| 2004/0203767 A1 | 10/2004 | Fraser et al. | |
| 2005/0080519 A1 | 4/2005 | Oesterling et al. | |
| 2005/0246080 A1* | 11/2005 | Watkins et al. | 701/35 |
| 2006/0235579 A1 | 10/2006 | Oesterling et al. | |
| 2007/0038346 A1* | 2/2007 | Ehrlich et al. | 701/33 |
| 2007/0078999 A1* | 4/2007 | Corson et al. | 709/230 |
| 2007/0171854 A1* | 7/2007 | Chen et al. | 370/328 |
| 2007/0198144 A1* | 8/2007 | Norris et al. | 701/23 |
| 2008/0146219 A1* | 6/2008 | Habermas et al. | 455/428 |
| 2009/0029671 A1* | 1/2009 | Cho et al. | 455/345 |
| 2009/0088910 A1 | 4/2009 | Yi et al. | |

(Continued)

FOREIGN PATENT DOCUMENTS

CN    1936989 A    3/2007

*Primary Examiner* — Asad Nawaz
*Assistant Examiner* — Saad A Waqas
(74) *Attorney, Agent, or Firm* — Leydig, Voit & Mayer, Ltd.

(57) ABSTRACT

The described method and system provide for synchronizing a mobile application on a mobile device with a DRx (discontinuous receive) schedule of a vehicle. When the vehicle ignition is turned off, a telecommunications unit on the vehicle sends a synchronization message to the mobile device, which allows the mobile application to synchronize with the DRx schedule of the vehicle. The DRx schedule includes a standby mode, a cyclic mode, and a powered down mode for the vehicle, and user requests inputted into the mobile application will be processed according to the mobile application's determination of vehicle availability during those modes. The mobile application is thus able to inform the user of the vehicle status at any point during the vehicle's DRx schedule without requiring any further information from the vehicle after the synchronization message.

12 Claims, 4 Drawing Sheets

(56) References Cited

U.S. PATENT DOCUMENTS

| | | |
|---|---|---|
| 2010/0035602 A1 | 2/2010 | Doherty et al. |
| 2010/0259682 A1* | 10/2010 | Unger .......................... 348/569 |
| 2010/0311473 A1* | 12/2010 | Deshpande et al. .......... 455/573 |

\* cited by examiner

MOBILE APPLICATION DRX SYNCHRONIZATION WITH EMBEDDED VEHICLE HARDWARE

BACKGROUND OF THE INVENTION

Wireless communication services available for mobile vehicles, such as navigation and roadside assistance, have increased rapidly in recent years. Services that may be requested while the vehicle ignition is off may include maintenance and diagnostic functions, system updates, vehicle position determination, unlocking of the doors, or vehicle alarm silencing. At the same time, the popularity of smartphones, netbooks, tablet computing devices, laptops and other portable electronics devices has also continued to grow. One area experiencing extremely rapid growth is the development of mobile applications, as mobile phones and tablets now have the capabilities to provide consumers with increasingly sophisticated programs suitable for a broad range of tasks. These mobile applications, accessible from a consumer's phone or tablet, may now be used to provide these wireless communication services available for mobile vehicles from wherever the consumer may be.

When the ignition of the mobile vehicle is off, the vehicle is placed into a powered-down discontinuous-receive (DRx) or standby state (also called a sleep cycle). Vehicle hardware, such as a telematics unit, may be placed into the standby state or DRx cycle to minimize power drain on the vehicle battery. Even while vehicle hardware is in the standby state or DRx cycle, a network access device (NAD) of the vehicle may consume power while searching for signal or waiting for a command, draining the vehicle's battery. Thus, after a certain amount of time, the vehicle may end the standby period or the DRx cycle and switch to an off mode. During certain periods of the DRx cycle and after the vehicle hardware is switched to an off mode, the vehicle hardware may be unable to communicate with a consumer's mobile application.

Thus, it is an object in part to provide a system and method for synchronizing the mobile applications used by consumers with vehicle hardware such that the consumer knows when the vehicle hardware will be available for the performance of requests through the mobile application when the vehicle ignition is off. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for synchronizing a mobile application on a mobile device with a DRx (discontinuous receive) schedule of a vehicle. When the vehicle ignition is turned off, a telecommunications unit on the vehicle sends a synchronization message to the mobile device, which allows the mobile application to synchronize with the DRx schedule of the vehicle. The DRx schedule includes a standby mode, a cyclic mode, and a powered down mode for the vehicle, and user requests inputted into the mobile application will be processed according to the mobile application's determination of vehicle availability during those modes. The synchronization message may include an external source of time such as GPS time or GPRS time, or it may include an amount of time that has elapsed as determined by a DRx timer on the vehicle. In further implementations, the synchronization message may also include information regarding the DRx schedule of the vehicle (e.g. how long each the vehicle will stay in each of the operational modes).

Based on the synchronization message, the mobile application can determine whether the vehicle is available for receiving user requests or not, and if the vehicle is available, the mobile application immediately sends the requests to the vehicle for processing. If the vehicle is not available, the mobile application notifies the user of the status of the vehicle (i.e. that it is unavailable) and may further notify the user of the next time the vehicle will become available if the vehicle is in cyclic mode. The mobile application may further notify the user of when the vehicle is entering the powered down mode.

If the vehicle is in a region where cellular service is unavailable when the vehicle ignition is turned off, the telecommunications unit of the vehicle may send a message to the mobile device over a short-range wireless technology such as Bluetooth informing the mobile application of the unavailability of cellular service. The vehicle telecommunications unit may then search for cellular service during the vehicle's standby mode and cyclic mode until cellular service becomes available. When cellular service becomes available, the telecommunications unit may send a synchronization message out to the mobile application over the cellular network, and may further notify the mobile application of the current status of the vehicle's DRx schedule.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for synchronizing a mobile application on a mobile device with a DRx (discontinuous receive) schedule of a vehicle. A telecommunications unit on the vehicle sends a synchronization message to the mobile device when the vehicle ignition is turned off, allowing the mobile device to determine the status of the vehicle during the vehicle's DRx schedule without further communication from the vehicle. By utilizing the synchronization, the mobile application is able to more efficiently and effectively process user requests and notify the user of the vehicle status.

Figure 1:
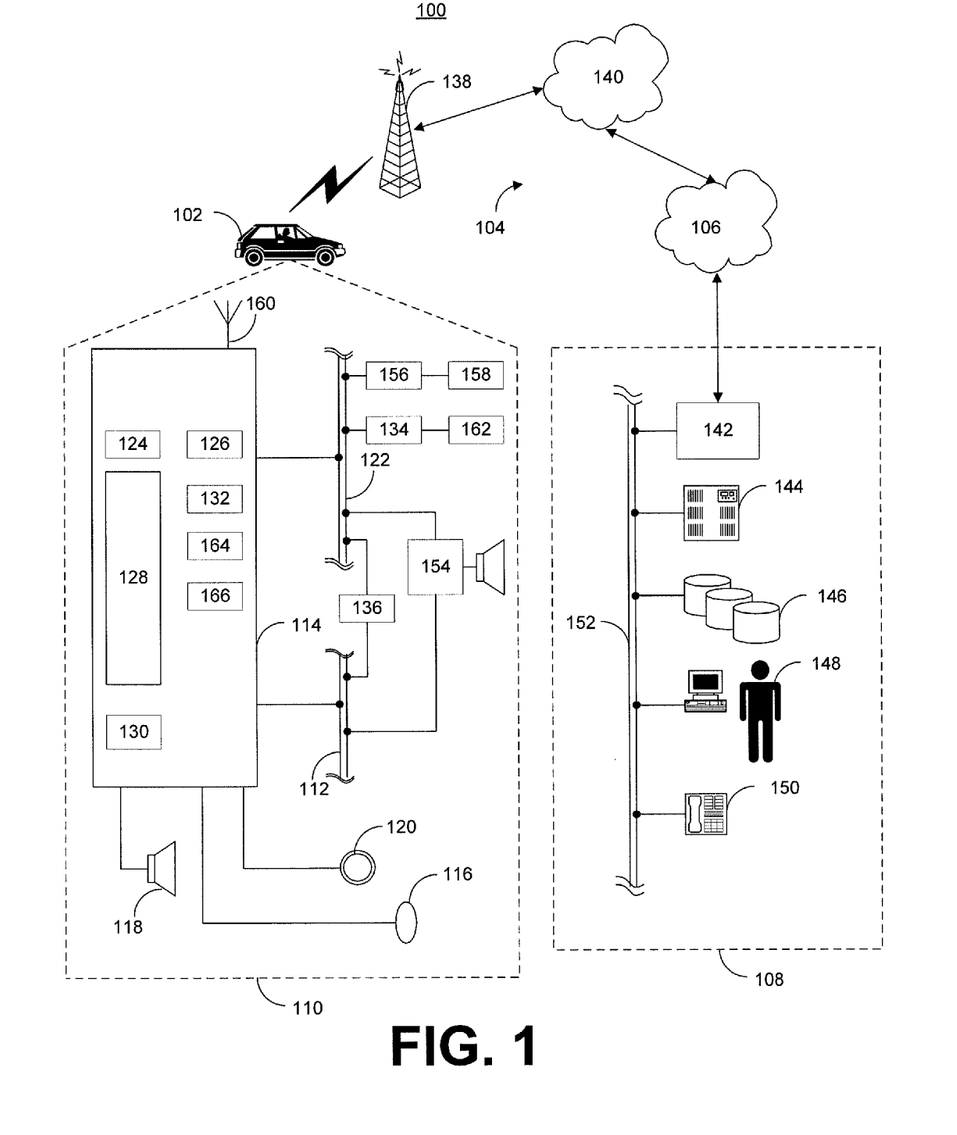
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. (Note that a TCP/IP type data connection over 3G, 4G, etc. may be used instead of a voice channel). Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component. Vehicle communications can also be conducted over short-range wireless technologies such as, for example, Bluetooth technology. The telematics unit 114 may include a short-range wireless component 164 that allows transmission of messages over short distances as an alternative to vehicle communications through the cellular chipset/component 160.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The vehicle 102 further includes a DRx timer 166, which may be part of the telematics unit 114 or separate from the telematics unit 114 and in communication with the telematics unit 114 through vehicle bus 122. The DRx timer 166 keeps track of the amount of time that elapses after the vehicle ignition is turned off. The DRx timer 166 may use an external source of time, such as GPS time, GPRS time, or an internal source of time, for example, by simply starting from zero and counting how much time has elapsed. Based on the amount of time that elapses after the vehicle ignition is turned off, vehicle components may operate in different modes, such as standby mode, cyclic mode, and a powered down mode.

It will be appreciated that, depending on how the system is implemented, the role of the DRx timer 166 may vary. For example, in one implementation the DRx timer 166 may simply provide information regarding an amount of time that has elapsed to other vehicle components such that those other components perform certain functions and operate according to information received from the DRx timer. In another implementation, the DRx timer 166 may actually send control signals to other components that tells those components what to do based on the elapsed time rather than simply sending timing information. It will thus be appreciated that the DRx schedule for vehicle components may be stored at the components themselves or at the DRx timer.

Although the communication environment 100 depicts the vehicle as having a telematics unit 114, it will be appreciated that the inventive principles described herein may be implemented with any vehicle 102 that includes a DRx timer 166 connected to a telecommunications unit capable of communicating over a wireless network 104 given appropriate programming of the telecommunications unit and DRx timer to carry out the processes described herein. For example, the processing device 128 of telematics unit 114 may execute instructions stored on the electronic memory device 130, which may include a tangible computer-readable medium, e.g. RAM, ROM, PROM, volatile, nonvolatile, or other electronic memory mechanism, adapted for storing computer-executable instructions and corresponding applications.

Figure 2:
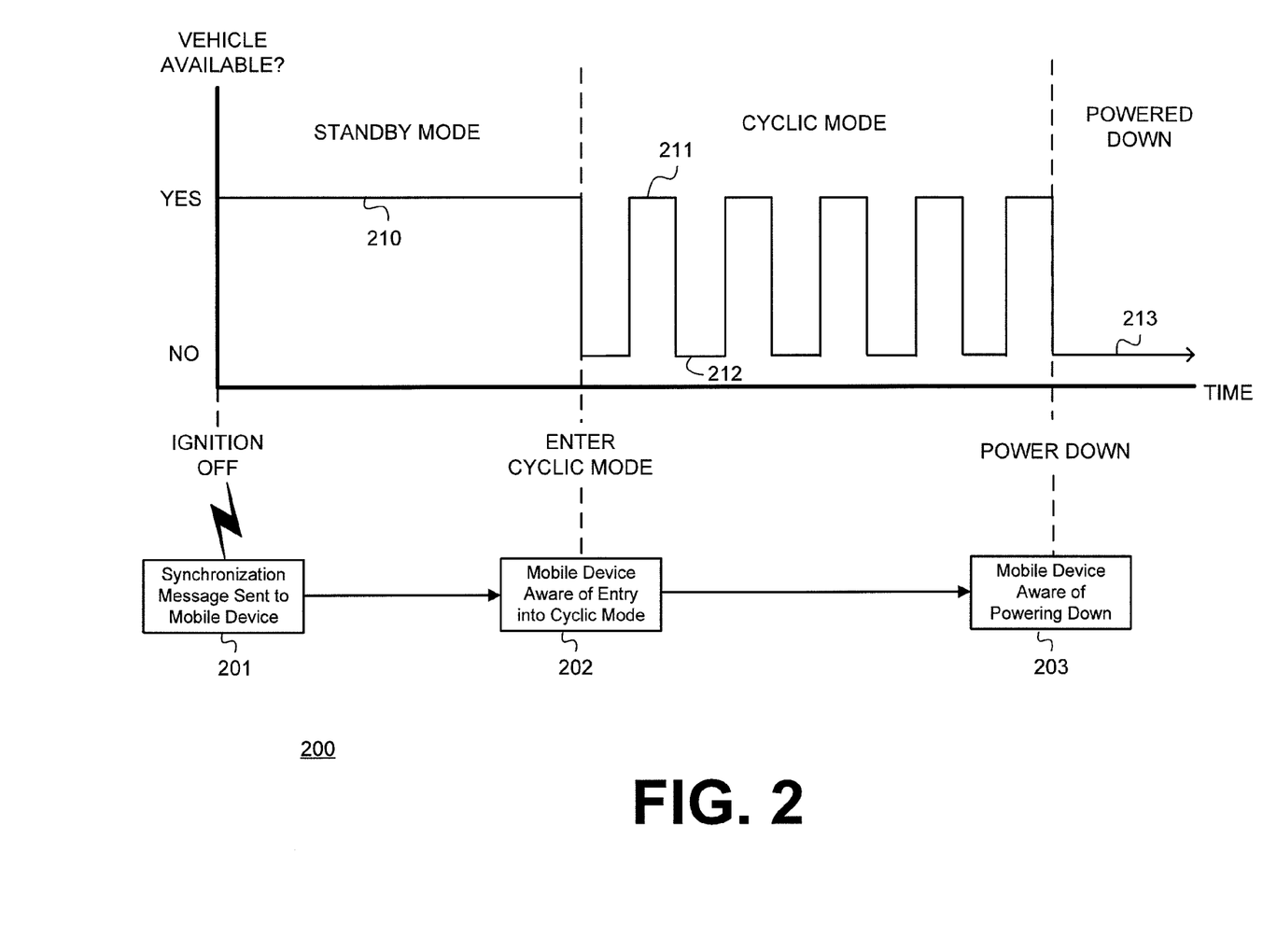
FIG. 2 is a diagram showing operation of a vehicle in different modes relative to a mobile application according to an implementation of the described principles.

Given the general operating environment of FIG. 1, and turning more specifically to FIG. 2, a diagram is shown that illustrates a DRx schedule and the operation of the DRx timer in connection with a mobile application on a user's mobile device in one implementation. The mobile device may be any device with a processor, memory, and appropriate telecommunications hardware, capable of storing instructions and applications, executing those applications, and communicating over a wireless network, such as for example, mobile phones, tablet computers, netbooks, laptop computers, etc. The mobile application may be programmed such that it enables a user to view information from the mobile device's display and allow the user to send and receive data over a network to and from a vehicle telecommunications unit.

In an alternative implementation, the vehicle owner does not need to have a mobile phone. Rather, the synchronization functionality is handled off-board. Thus, when the vehicle is shut down, it calls the service e provider's back-office, and then the information is sent to the subscriber via e-mail or other format not requiring a mobile device.

To give a particular example of vehicle operation according to the DRx schedule depicted in FIG. 2, after a vehicle's ignition is turned off, the vehicle enter a standby mode 210 for two days where the communications sent over the wireless network 104 to the vehicle 102 are readily received and processed (i.e. the vehicle is available to receive communications). After two days of standby mode, the vehicle may enter into a cyclic mode, and the vehicle cycles between being available 211 and unavailable 212. The vehicle may remain available 211, for example, for ten minutes at a time, and then become unavailable 212 for the next ten minutes, repeating the cycle until five days have passed and the vehicle enters the powered down state 213. The vehicle 102 then remains in the powered down state 213 indefinitely, until the vehicle ignition is turned back on or some other event occurs. It will be appreciated that, at any time during this DRx schedule, if the vehicle ignition is turned back on, the vehicle will break from the DRx schedule and enter an "awake" state independent from the DRx schedule, and the DRx schedule will start over from the beginning the next time the vehicle ignition is turned off. It will also be appreciated that all the specific times described herein are merely exemplary, and any amount of time may be designated for the standby mode, the length of the cycles in cyclic mode (which do not have to be the same from cycle to cycle), and the amount of time after which the vehicle powers down. For example, the vehicle could go through a standby mode that lasts for 12 hours in another embodiment, enter a cyclic mode with cycles of 15 minutes available and 20 minutes unavailable, and then power down after 90 days of operating in cyclic mode.

At the start of the standby mode, when the vehicle ignition is turned off, the telecommunications unit of the vehicle sends a synchronization message to the mobile device 201 that synchronizes the mobile application with the DRx timer of the vehicle 102. The synchronization message may be sent in SMS (short message service) form, AIF (application integration framework) form, or any other suitable format that the mobile device is capable of processing. The synchronization message includes information regarding the time, such as the GPS time, GPRS time, or an amount of elapsed time relative to the ignition being turned off. The mobile application then uses the time information to synchronize itself with the DRx schedule of the vehicle, which allows the mobile application to determine the status of the vehicle without further communication with the vehicle. It will be appreciated that the synchronization message may include the DRx schedule information of the vehicle, or the mobile application may obtain the DRx schedule from another source, such as the call center, or the mobile application may be pre-loaded with the synchronization schedule.

It will further be appreciated that there may be variations in the particular method used to synchronize the mobile application with the vehicle's DRx schedule. For example, both the mobile application and the DRx timer could rely on a common external timer such as GPS time or GPRS time, and the synchronization message informs the mobile application at which point in GPS time or GPRS time the vehicle ignition was turned off. In another example, the mobile application could be programmed to take into account an offset between the time information received from the vehicle and its own internal timer/clock to keep track of the DRx schedule. Whichever method is used, after the vehicle ignition is turned off, the mobile application should become synchronized with the DRx schedule of the vehicle, and thus, as depicted in FIG. 2, the mobile application can determine when the vehicle has entered into cyclic mode 202 and when the vehicle powers down 203 without receiving additional information from the vehicle.

Figure 3:
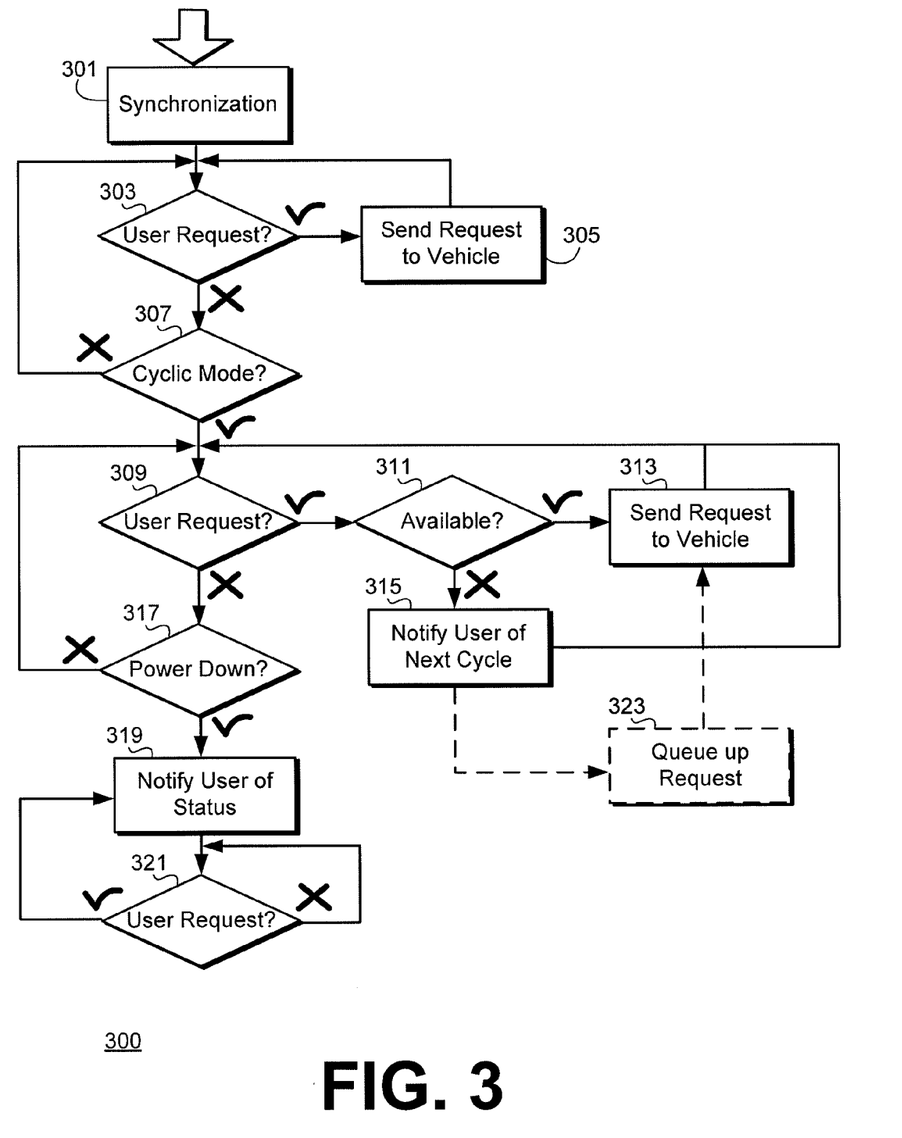
FIG. 3 is a flowchart illustrating a process for sending a request from a mobile application to a vehicle changing between different modes according to an implementation of the described principles.

Thus, when a user wishes to send requests to the vehicle, such as remotely unlocking the doors of the vehicle or turning the vehicle ignition on from the user's mobile device, the mobile device will know whether the vehicle is available to receive and execute the user's request. It will be appreciated that user requests may be sent directly to the vehicle from the mobile application, or may be sent to a call center first with the call center then forwarding the request to the vehicle through a call center-initiated call. Turning now to FIG. 3, operation of the mobile application in one implementation is depicted in the context of the different operational modes of the vehicle. When the vehicle ignition is turned off, the mobile application receives a synchronization message over a cellular network from the vehicle telecommunications unit and synchronizes itself 301 to the DRx schedule of the vehicle. If the mobile application receives a user request 303 while the vehicle is in standby mode, the mobile application can immediately send that request to the vehicle 305 for processing, since the mobile application knows that the vehicle is standing by and available to receive requests.

After the vehicle enters cyclic mode 307, the mobile application processes any user requests 309 based on whether the vehicle is available for receiving requests or not 311. If the vehicle is available, the mobile application simply sends the request to the vehicle 313. However, if the vehicle is not available, the mobile application may inform the user that the vehicle is currently in the unavailable portion of its cyclic mode (e.g. by displaying a message on the screen of the mobile device to the user). The mobile application may further inform the user of the time at which the vehicle will next enter the available phase of its cyclic mode 315 (e.g. "the vehicle will be available at 3:07 PM" or "the vehicle will next be available for requests from 3:07 PM-3:17 PM"). In a further implementation, the mobile application may queue up the request 323 and send it to the vehicle 313 automatically when the vehicle next becomes available. This might be preferable for some requests, such as retrieving information from the vehicle, and might not preferable for others, such as unlocking the car doors, and thus the mobile application may further give the user a choice to queue up the request or not.

When the vehicle enters the powered down mode 317, the mobile application notifies the user that the vehicle is powering down and will be unavailable for requests from the user or from the call center 319. If the user attempts to communicate with the vehicle through the mobile application while the vehicle is powered down 321, the mobile application may display a message informing the user that the vehicle is unavailable to receive requests. However, in a further implementation, the mobile application may give the user options regarding how the user can interact with the vehicle. For example, while the vehicle is powered down, the mobile application could provide the user with the ability to command the vehicle to change modes back to a standby mode, or provide the user with the option of contacting the call center to have the call center initiate a procedure to force the vehicle into a different state. In another implementation, the DRx schedule of the vehicle may be configured such that there are certain functions that the mobile application can perform with respect to the vehicle even after the vehicle enters the powered down mode (e.g. making emergency-related requests available during all modes).

Figure 4:
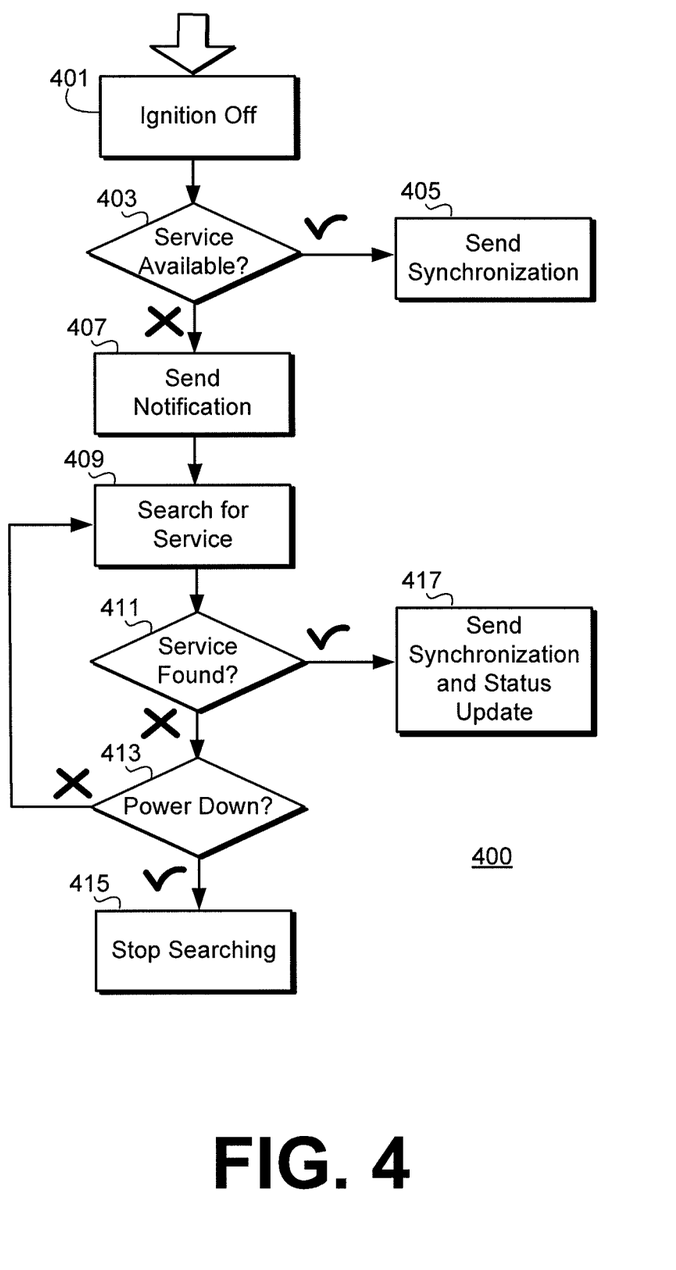
FIG. 4 is a flowchart illustrating a process for sending a synchronization message to a mobile device and searching for service according to an implementation of the described principles.

A problem arises when the vehicle is located in areas with poor cellular signal quality and the vehicle may be unavailable for requests due to a lack of cellular service. Turning now to FIG. 4, a process for handling this situation in one implementation is depicted. When the vehicle ignition is turned off 401, the vehicle telecommunications unit is notified that the ignition is off and sends a synchronization message 405 to the mobile application if service is available 403. However, if service is unavailable 403, the vehicle telecommunications unit sends a message over a short-range wireless technology, such as Bluetooth, to the mobile device, notifying the mobile application and the user that vehicle services may not be available. The vehicle telecommunications unit then searches for service 409, and if service is found 411, it sends a synchronization message to the mobile application. In a further implementation, the synchronization message may include the current status of the vehicle's DRx schedule and a description of its state, or, alternatively, the mobile application could generate a message indicating the current status of the vehicle's DRx schedule based on the synchronization message to inform the user of the status of the vehicle.

If no service has been found 411 and the vehicle enters the cyclic mode, the vehicle telecommunications unit may continue searching for service during the parts of cyclic mode where the vehicle would have been available had cellular service been available. After the vehicle enters powered down mode 413, the vehicle telecommunications unit may stop searching 415, and the mobile application may further notify the user that the vehicle has entered powered down mode and will stop searching for service based on the time at which it received the short-range wireless message.

It will be appreciated that the DRx schedule may be adjusted based on a lack of cellular service. For example, because it may consumer additional power to search for signal relative to just standing by, the length of the standby and cyclic modes of the vehicle may be reduced accordingly. This reduction in length may be taken into account by the synchronization message ultimately sent to the mobile application when service is found, if it is found at all. It will further be appreciated that if cellular service is available at ignition-off but later becomes unavailable, the vehicle telecommunications unit may attempt to send a short-range notification 407 (which may or may not be successful depending on the location of the user) and may begin searching for service 409, continuing the process 400 as depicted in FIG. 4.

It will be appreciated that the described system and method allows for synchronization of a mobile application with a vehicle's DRx schedule using a DRx timer on the vehicle. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for synchronizing a mobile application on a mobile device with a discontinuous receive (DRx) schedule of a telematics-equipped vehicle, the method comprising:
   determining, by a telematics unit of the telematics-equipped vehicle, that a vehicle ignition has been turned off;
   determining, by the telematics unit, whether cellular communications services are available for communications with the mobile device;
   adjusting, by the telematics unit, based on cellular communications services being unavailable, the DRx schedule of the telematics-equipped vehicle based on an amount of power consumed by the telematics unit when searching for the cellular communications services;
   sending, by the telematics unit, in response to determining that the vehicle ignition has been turned off and in response to determining that cellular communications services are available, a synchronization message to the mobile device for coordinating communications between the mobile device and the telematics unit, the synchronization message including information regarding the DRx schedule of the telematics-equipped vehicle, wherein the information regarding the DRx schedule of the telematics-equipped vehicle indicates multiple time periods at which the telematics unit is available during a cyclic mode of a fixed duration of the telematics unit;
   while the telematics unit is available in the cyclic mode, receiving, by the telematics unit, after the sending, a request from the mobile device, wherein the time at which the request was sent by the mobile device is based on the information regarding the DRx schedule of the telematics-equipped vehicle; and
   carrying out, by the telematics unit, the received request;
   wherein the mobile device is a user's mobile computing device, and the method further comprises:
   determining, by the mobile device, whether the telematics unit is available for carrying out requests and whether the telematics unit is in the cyclic mode based on the information regarding the DRx schedule of the telematics-equipped vehicle; and
   notifying, in response to determining that the telematics unit is not available for carrying out requests and the telematics unit is in the cyclic mode, the user of a next time the telematics unit will become available via a mobile application of the mobile device.

2. The method according to claim 1, wherein the synchronization message further includes information regarding a reference time to be used by the mobile device.

3. The method according to claim 2, wherein the information regarding the reference time indicates that Global Positioning System (GPS) time or General Packet Radio Service (GPRS) time is to be used as the reference time.

4. The method according to claim 1, further comprising:
   notifying, by the telematics unit, in response to cellular communications services being unavailable, the mobile device that cellular communications services are unavailable via a short-range wireless message.

5. A non-transitory, processor-readable medium of a telematics unit of a telematics-equipped vehicle having processor-executable instructions stored thereon for synchronizing a mobile application on a mobile device with a discontinuous receive (DRx) schedule of the telematics-equipped vehicle, the processor-executable instructions, when executed by a processor, facilitating performance of the following steps:

determining, by the telematics unit, that a vehicle ignition has been turned off;

determining, by the telematics unit, whether cellular communications services are available for communications with the mobile device;

adjusting, by the telematics unit, based on cellular communications services being unavailable, the DRx schedule of the telematics-equipped vehicle based on an amount of power consumed by the telematics unit when searching for the cellular communications services;

sending, by the telematics unit, in response to determining that the vehicle ignition has been turned off and in response to determining that cellular communications services are available, a synchronization message to the mobile device for coordinating communications between the mobile device and the telematics unit, the synchronization message including information regarding the DRx schedule of the telematics-equipped vehicle, wherein the information regarding the DRx schedule of the telematics-equipped vehicle indicates multiple time periods at which the telematics unit is available during a cyclic mode of a fixed duration of the telematics unit;

while the telematics unit is available in the cyclic mode, receiving, by the telematics unit, after the sending, a request from the mobile device, wherein the time at which the request was sent by the mobile device is based on the information regarding the DRx schedule of the telematics-equipped vehicle; and carrying out, by the telematics unit, the received request;

wherein the mobile device is a user's mobile computing device configured to:

determine whether the telematics unit is available for carrying out requests and whether the telematics unit is in the cyclic mode based on the information regarding the DRx schedule of the telematics-equipped vehicle; and in response to determining that the telematics unit is not available for carrying out requests and the telematics unit is in the cyclic mode, notify the user of a next time the telematics unit will become available via a mobile application of the mobile device.

6. The processor-readable medium according to claim 5, wherein the synchronization message further includes information regarding a reference time to be used by the mobile device.

7. The processor-readable medium according to claim 6, wherein the information regarding the reference time indicates that Global Positioning System (GPS) time or General Packet Radio Service (GPRS) time is to be used as the reference time.

8. The processor-readable medium according to claim 5, wherein the processor-executable instructions, when executed by the processor, further facilitate performance of the following step:

notifying, by the telematics unit, in response to cellular communications services being unavailable, the mobile device that cellular communications services are unavailable via a short-range wireless message.

9. A system for synchronizing a mobile application on a mobile device with a discontinuous receive (DRx) schedule of a telematics-equipped vehicle, the system comprising:

a telematics unit of the telematics-equipped vehicle, configured to:

determine that a vehicle ignition has been turned off;

determine whether cellular communications services are available for communications with the mobile device;

adjust, based on cellular communications services being unavailable, the DRx schedule of the telematics-equipped vehicle based on an amount of power consumed by the telematics unit when searching for the cellular communications services;

send, in response to determining that the vehicle ignition has been turned off and in response to determining that cellular communications services are available, a synchronization message to the mobile device for coordinating communications between the mobile device and the telematics unit, the synchronization message including information regarding the DRx schedule of the telematics-equipped vehicle, wherein the information regarding the DRx schedule of the telematics-equipped vehicle indicates multiple time periods at which the telematics unit is available during a cyclic mode of a fixed duration of the telematics unit;

receive a request from the mobile device; and carry out the request; and the mobile device, configured to:

receive the synchronization message;

determine a time for sending the request to the telematics unit while the telematics unit is available during the cyclic mode of operation based on the information regarding the DRx schedule of the telematics-equipped vehicle; and send the request to the telematics unit;

wherein the mobile device is a user's mobile computing device, and the mobile device is further configured to:

determine whether the telematics unit is available for carrying out requests and whether the telematics unit is in the cyclic mode based on the information regarding the DRx schedule of the telematics-equipped vehicle; and in response to determining that the telematics unit is not available for carrying out requests and the telematics unit is in the cyclic mode, notify the user of a next time the telematics unit will become available via a mobile application of the mobile device.

10. The system according to claim 9, wherein the synchronization message further includes information regarding a reference time to be used by the mobile device, and the mobile device and the telematics unit are configured to use the same reference time.

11. The system according to claim 10, wherein the information regarding the reference time indicates that Global Positioning System (GPS) time or General Packet Radio Service (GPRS) time is to be used as the reference time.

12. The system according to claim 9, wherein the telematics unit is further configured to notify, in response to cellular communications services being unavailable, the mobile device that cellular communications services are unavailable via a short-range wireless message.

* * * * *